US 6,947,630 B2

United States Patent
Kai et al.

(10) Patent No.: US 6,947,630 B2
(45) Date of Patent: Sep. 20, 2005

(54) CONTROL METHOD AND CONTROL APPARATUS FOR VARIABLE WAVELENGTH OPTICAL FILTER

(75) Inventors: Yutaka Kai, Kawasaki (JP); Hideyuki Miyata, Kawasaki (JP); Isao Tsuyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 10/284,299

(22) Filed: Oct. 31, 2002

(65) Prior Publication Data

US 2003/0179988 A1 Sep. 25, 2003

(30) Foreign Application Priority Data

Mar. 22, 2002 (JP) ........................................ 2002-080420

(51) Int. Cl.$^7$ ................................................ G02B 6/28
(52) U.S. Cl. ........................... 385/24; 385/37; 372/20; 372/38; 359/578; 359/579
(58) Field of Search ..................... 385/24, 37; 372/20, 372/38; 359/578, 579, 589, 179, 187, 188, 193, 195

(56) References Cited

U.S. PATENT DOCUMENTS

| | | | | |
|---|---|---|---|---|
| 3,681,648 A | * | 8/1972 | Mack ......................... | 315/391 |
| 4,671,620 A | * | 6/1987 | Yao ............................ | 359/311 |
| 5,101,294 A | * | 3/1992 | Jain et al. ................... | 359/285 |
| 5,218,653 A | * | 6/1993 | Johnson et al. ............. | 385/11 |
| 5,359,451 A | * | 10/1994 | Gelbart et al. ............. | 359/285 |
| 5,542,809 A | * | 8/1996 | Kita et al. .................. | 414/528 |
| 5,548,434 A | * | 8/1996 | Shimonaka et al. ....... | 398/162 |
| 5,703,357 A | * | 12/1997 | Shih et al. .................. | 250/226 |
| 5,781,332 A | * | 7/1998 | Ogata ......................... | 359/308 |
| 5,801,861 A | * | 9/1998 | Majima ....................... | 398/95 |
| 5,824,567 A | * | 10/1998 | Shih et al. ................... | 438/73 |
| 5,850,492 A | * | 12/1998 | Morasca et al. ............ | 385/11 |
| 5,949,562 A | * | 9/1999 | Kubota et al. .............. | 398/79 |
| 6,043,922 A | * | 3/2000 | Koga et al. ................. | 398/213 |
| 6,271,944 B1 | * | 8/2001 | Schemmann et al. ...... | 398/196 |
| 6,343,165 B1 | * | 1/2002 | Kim et al. ................... | 385/28 |
| 6,490,067 B2 | * | 12/2002 | Bloom et al. .............. | 398/128 |
| 6,560,021 B2 | * | 5/2003 | Itou ............................ | 359/579 |
| 6,594,069 B1 | * | 7/2003 | Nakazawa et al. ......... | 359/308 |
| 2001/0033411 A1 | * | 10/2001 | Shiota et al. ............... | 359/333 |
| 2002/0024736 A1 | * | 2/2002 | Itou ............................ | 359/578 |
| 2003/0123789 A1 | * | 7/2003 | Miyata et al. .............. | 385/24 |
| 2003/0179988 A1 | * | 9/2003 | Kai et al. .................... | 385/24 |
| 2004/0052520 A1 | * | 3/2004 | Halgren et al. ............ | 398/5 |

FOREIGN PATENT DOCUMENTS

JP          09285128 A  *  10/1997   .......... H02M/7/217

* cited by examiner

Primary Examiner—John R. Lee
Assistant Examiner—David A. Vanore
(74) Attorney, Agent, or Firm—Staas & Halsey LLP

(57) ABSTRACT

The present invention has an object to provide a control method and a control apparatus for a variable wavelength optical filter, which can reliably and stably control drive conditions of the variable wavelength optical filter, independent of the number of wavelengths to be selectively separated in collective. To this end, the control apparatus for a variable wavelength optical filter according to the present invention comprises: a light reception section that takes out to receive, in collective, monitor light corresponding to each optical signal selectively separated by the variable wavelength optical filter, and creates a monitor signal a level of which is changed corresponding to the power of the received monitor light; an alternating current component extraction section that extracts an alternating current component of the monitor signal generated by the light reception section; and a tracking control section that controls the drive condition of the variable wavelength optical filter based on a level change in the alternating current component extracted by the alternating current component extraction section.

22 Claims, 10 Drawing Sheets

CONTROL METHOD AND CONTROL APPARATUS FOR VARIABLE WAVELENGTH OPTICAL FILTER

BACKGROUND OF THE INVENTION (1) Field of the Invention

The present invention relates to a control method and a control apparatus for a variable wavelength optical filter that selectively separates optical signals of desired wavelengths from wavelength division multiplexed (WDM) signal light including a plurality of optical signals of different wavelengths. In particular, the present invention relates to a control technique for a variable wavelength optical filter for when collectively processing selective separation of optical signals of multiple wavelengths.

(2) Description of the Related Art

Recently, with the explosive increase in data communication demand mainly on Internet traffic, higher capacity and ultra-longer distances for backbone networks are being demanded. Furthermore, since services used by users are becoming multifarious, there is a demand to simultaneously realize an economical network having high reliability and flexibility.

Currently, by wavelength division multiplexing transmission (WDM) techniques and optical amplification techniques, higher capacity and ultra-longer distances have been drastically progressed, enabling a decrease in transmission path cost. However, in the case of increasing information processing ability of a network node following higher speed of transmission signal and larger capacity, in conventional photoelectric conversion and electrical switching methods, there is caused an increase in node cost and a larger scale. From the above background, for more economical and smaller size nodes, development of optical add drop multiplexing (OADM) devices and optical cross connect (OXC) devices is anticipated, which replace large scale electronic circuits with optical components, to perform various processing in optical path units of an optical wavelength region.

Of these devices, a large number of optical function devices are used, such as an optical switch having functions for switching light on or off, for attenuating light, for switching to 1×n, and the like, or a wavelength filter for dividing signal light for each wavelength.

Among the aforementioned optical function devices, a device that can collectively process optical signals of a desired plurality of wavelengths from WDM signal light, is an important key device for realizing an OADM. Such a device that can collectively process is, for example, a device that can collectively block or drop multi-wavelength optical signals. More specifically, as such a device, devices such as for example, an acousto-optic tunable filter (AOTF), a fiber Bragg grating (FBG) filter, and the like are well-known.

FIG. 14 is a diagram showing one example of a conventional network configuration of OADM nodes using AOTFs.

Each OADM node of the network configuration as shown in FIG. 14, is required to have a function for selectively dropping an optical signal of a desired wavelength or a function for selectively blocking an optical signal of a desired wavelength. Collective dropping of optical signals of a plurality of wavelengths is a function which is required at a node (node 1 in FIG. 14) of a position where two or more ring nets or networks are overlapped with each other, and is necessary when optical signals of a plurality of wavelengths are sent from one network to the other network. Collective blocking of optical signals of a plurality of wavelengths is a function which is necessary in the case of blocking the passage of, for example, optical signals of a wavelength which needs to be terminated, or optical signals of a wavelength which overlaps with that of an optical signal to be added, amongst optical signals passing through within a node. At each OADM node, it is important to be able to drop and add optical signals for arbitrary wavelengths, in order to flexibly operate the network. For this purpose, it is also necessary to perform the aforementioned collective processing for optical signals of arbitrary wavelengths, and a variable wavelength optical filter such as an AOTF having a wavelength variable function, is useful.

FIG. 15 is a diagram showing a configuration example of the OADM device used for each node in FIG. 14. The OADM device in FIG. 15 includes an OADM unit (W) and an OADM unit (P) respectively corresponding to a work channel and a protection channel of a network. At each OADM unit, drop processing, block processing and add processing are respectively performed for WDM signal light being transmitted. In the drop processing in this configuration example, a part of input WDM signal light is separated by an optical coupler on an input side, and further branched corresponding to the required number of wavelengths, and then an optical signal of a desired wavelength is selectively dropped from the respective branched lights, using a drop type AOTF. In the block processing, WDM signal light having passed through the optical coupler on the input side is sent to a reject type AOTF, so that the passing of an optical signal of a desired wavelength is blocked. In the add processing, an optical signal of a desired wavelength to be added to WDM signal light at this node is wavelength multiplexed, and then sent to an optical coupler on an output side to be added to WDM signal light having passed through the reject type AOTF.

Incidentally, in the case where desired optical signals of a plurality of wavelengths are selectively separated using a variable wavelength optical filter, it is necessary to completely make the transmission central wavelength of filtering characteristics coincide with the aforementioned desired plurality of wavelengths. If the transmission central wavelength of the variable wavelength optical filter does not coincide with the wavelengths of optical signals, deterioration of rejection level, erroneous blocking of optical signals of other channels or the like, occurs in the block processing. Moreover, an increase in insertion loss, erroneous dropping of optical signals of other channels, or the like, in the variable wavelength optical filter, occurs in the drop processing, and this is fatal to the results of processing executed at the OADM nodes.

Generally, the wavelength of a transmission light source using a semiconductor laser (laser diode, LD) or the like has fluctuations. Moreover, for a variable wavelength optical filter itself, fluctuations occur in the transmission central wavelength due to a change with time, environmental variations, control errors or the like. Therefore, in order to realize a stable operation of OADM node, a tracking control detecting errors caused by the aforementioned wavelength fluctuations to feeds back to the control of the variable wavelength optical filter is indispensable.

This tracking control, for example, in the case of block processing, takes out an optical signal which has a complementary relationship with an optical signal whose passage is obstructed, as monitor light from the variable wavelength optical filter, and controls the variable wavelength optical filter so that the monitor light becomes a maximum.

Furthermore, in the case of drop processing, it branches a part of the dropped light dropped by the variable wavelength optical filter, as monitor light, and controls the variable wavelength optical filter so that the monitor light becomes a maximum.

Such a tracking control of a variable wavelength optical filter is often performed individually, for example, for each wavelength to be selectively separated. In this case, only an error to the corresponding wavelength is detected and the result is fed back to the control of the corresponding transmission central wavelength. When block processing or drop processing for optical signals of multiple wavelengths is collectively performed, since multiple wavelength components of the aforementioned monitor light are also output collectively, there occurs a necessity for specifying which wavelength in the monitor light the detected error signal corresponds to.

As a method for specifying the corresponding wavelength of an error signal, there are methods such as for example, a method of adding a pilot tone (or dithering) to a drive signal corresponding to the wavelength being a control object, or a method of adding to a drive signal, dithering of different frequencies for each of the respective wavelengths. By each of these methods, it becomes possible to discriminate corresponding wavelengths of error signals. However, if the number of wavelengths for collective processing is increased so that the number of monitor lights to be collectively output is increased, power of the monitor lights other than wavelengths intended to be tracking controlled is increased, and the components thereof become noise for error signals. Therefore, in the case where detection accuracy of error signals is reduced due to an increase in the number of wavelengths for collective processing, there is caused a possibility that the tracking control of a variable wavelength optical filter becomes difficult.

Moreover, besides the above, for example, the reason why the tracking control of the variable wavelength optical filter becomes difficult is that, if consideration is given to saturation of an amplifier of a light receiver and an electronic circuit used for light reception processing of monitor light to make the dynamic ranges of these wider in advance so as to avoid saturation, since an amplitude of the error signal detected becomes relatively smaller, an S/N ratio of the error signal is deteriorated.

More specifically, consideration is given to, for example, a tracking control in the case of collective blocking optical signals of 10 waves using a rejection type AOTF. In this case, by applying to the rejection type AOTF, RF signals of 10 waves having frequencies set respectively corresponding to the wavelengths of each optical signal to be blocked, it becomes possible to block the passage of optical signals of 10 waves. In the tracking control at this time, 9 wave RF signals of the 10 wave RF signals are made to be fixed while adding dithering etc. to only the one wave RF signal, and a feedback control is performed on this RF signal, and this control is sequentially executed for all of the 10 wave RF signals.

In such a tracking control, for example as shown in FIG. 16, a monitoring circuit used for light reception processing of monitor lights corresponding to optical signals of 10 waves for which passage is to be blocked by the rejection type AOTF, is necessary to be designed so that it is not saturated even when it receives monitor lights of 10 wave components. Therefore, compared to a monitoring circuit used for a tracking control in the case of blocking only optical signals of one wave, in the monitoring circuit corresponding to 10 waves, a light reception voltage to be allocated to one wave becomes necessarily small. That is, as the maximum wavelength number the passage of which can be blocked by the rejection type AOTF is increased, a monitoring circuit is designed in expectation of such maximum wavelength number. Therefore, the light reception voltage to be allocated to one wave is decreased, making it difficult to accurately determine power variations of the monitor light corresponding to the channel which executes the tracking control (the reject ch. 6 in the example of FIG. 16).

Furthermore, as another reason why the tracking control of the variable wavelength optical filter becomes difficult, for example, it is possible that fluctuations of other wavelengths, which are close to a frequency of dithering to be added to the drive signal, cause deterioration in detection accuracy of the error signal. Moreover, since monitor lights corresponding to multiple wavelengths are collectively received, there is also a possibility of occurrence of power variations due to wavelength variations and polarization variations of each monitor light. Thus, it is also considered that such power variations are combined with the error component due to tracking, making the tracking control difficult.

As one method to solve the aforementioned problems related to the tracking control of variable wavelength optical filters, there is considered for example a method of separating the monitor lights of each wavelength output together corresponding to collective processing of optical signals of a plurality of wavelengths, for each wavelength by using a separately prepared optical filter, to detect error signals corresponding to each separated monitor light. However, in order to realize this method, for example, a fixed filter such as an arrayed waveguide grating (AWG) or a variable wavelength optical filter are newly required. Moreover, it also becomes necessary to respectively provide a light receiver and an electronic circuit corresponding to multiple monitor lights separated for each wavelength. Therefore, there is the drawback in leading a larger size and a higher cost for a variable wavelength optical filter inclusive of a controller.

SUMMARY OF THE INVENTION

The present invention has been accomplished in view of the above problems, with an object of providing a control method and a control apparatus for a variable wavelength optical filter, which can reliably and stably control drive conditions of the variable wavelength optical filter, independent of the number of wavelengths to be selectively separated in collective.

In order to achieve the aforementioned object, a control method according to the present invention for a variable wavelength optical filter that selectively separates in collective, optical signals of a plurality of wavelengths, for changing a drive condition of the variable wavelength optical filter, and controlling a wavelength characteristic of the variable wavelength optical filter to become closer to a wavelength characteristic corresponding to a preset plurality of selected wavelengths, based on power of monitor light taken out from the variable wavelength optical filter; comprises:

(1) taking out in collective to receive the monitor light corresponding to each optical signals selectively separated by the variable wavelength optical filter, and generating a monitor signal a level of which is changed corresponding to the power of the received monitor light;

(2) extracting an alternating current component of the generated monitor signal; and (3) controlling the drive condition of the variable wavelength optical filter based on a level change in the extracted alternating current component.

According to such a control method for a variable wavelength optical filter, for the monitor signal corresponding to light reception power of monitor light taken out from the variable wavelength optical filter, an alternating current component showing only a variation component (difference) thereof is extracted, and the drive condition is controlled based on a level change of the alternating current component, so that the control of the drive condition of the variable wavelength optical filter can be performed reliably and stably, independent of the number of wavelengths to be selectively separated in collective.

Furthermore, in the aforementioned control method for a variable wavelength optical filter, it is preferable to extract, from the extracted alternating current component, only a level variation component corresponding to a change in drive condition of the variable wavelength optical filter, and to control the drive condition of the variable wavelength optical filter based on the extracted level variation component. As a result, a possibility of confusion between a level variation in the monitor signal caused by changing the drive condition of the variable wavelength optical filter, and a level variation in the monitor signal caused by other factors is reduced. Hence, it becomes possible to perform the control of the drive condition of the variable wavelength optical filter more reliably and stably.

Furthermore, in the aforementioned control method for the variable wavelength optical filter, a direct current component of the monitor signal may be extracted, to control the drive condition of the variable wavelength optical filter based on a level of the extracted direct current component. As a result, it becomes possible to perform the control corresponding to a variation component of the monitor light power based on the level change of the alternating current component, and at the same time to execute the control corresponding to an absolute value of the monitor light power based on the level of the direct current component. Hence, it becomes possible to perform the control of the drive condition of the variable wavelength optical filter more flexibly.

In addition, a specific process in the aforementioned control method for a variable wavelength optical filter, may change the drive condition of the variable wavelength optical filter to a first condition and a second condition for which change amounts from a preset reference condition are mutually equal, to determine whether the reference condition in the next period control is to be set to the first condition or to the second condition, corresponding to a sign of a level value of the alternating current component extracted from the monitor signal.

According to such a specific process, the drive condition of the variable wavelength optical filter is tracking controlled to be optimized.

A control apparatus according to the present invention for a variable wavelength optical filter that selectively separates in collective, optical signals of a plurality of wavelengths, for changing a drive condition of the variable wavelength optical filter, and controlling a wavelength characteristic of the variable wavelength optical filter to become closer to a wavelength characteristic corresponding to a preset plurality of selected wavelengths, based on power of monitor light taken out from the variable wavelength optical filter, comprises: a light reception section that takes out in collective to receive the monitor light corresponding to each optical signals selectively separated by the variable wavelength optical filter, and generates a monitor signal a level of which is changed corresponding to the power of the received monitor light; an alternating current extraction section that extracts an alternating current component of the generated monitor signal; and a control section that controls the drive condition of the variable wavelength optical filter based on a level change in the alternating current component extracted by the alternating current component extraction section.

In such a control apparatus for a variable wavelength optical filter, the monitor light taken out from the variable wavelength optical filter, is received by the light reception section, wherein a monitor signal corresponding to the light reception power is generated, and the alternating current component showing only the variation component (difference) of the monitor signal, is extracted by the alternating current component extraction section. Then, the drive condition of the variable wavelength optical filter is controlled by the control section based on the level change of the extracted alternating current component so that the control of the drive condition of the variable wavelength optical filter can be reliably and stably performed, independent of the number of wavelengths to be selectively separated in collective.

Other objects, characteristics and advantages of this invention will become apparent from the following description of embodiments in relation to the appended drawings.

DETAILED DESCRIPTION OF THE INVENTION

Figure 1:
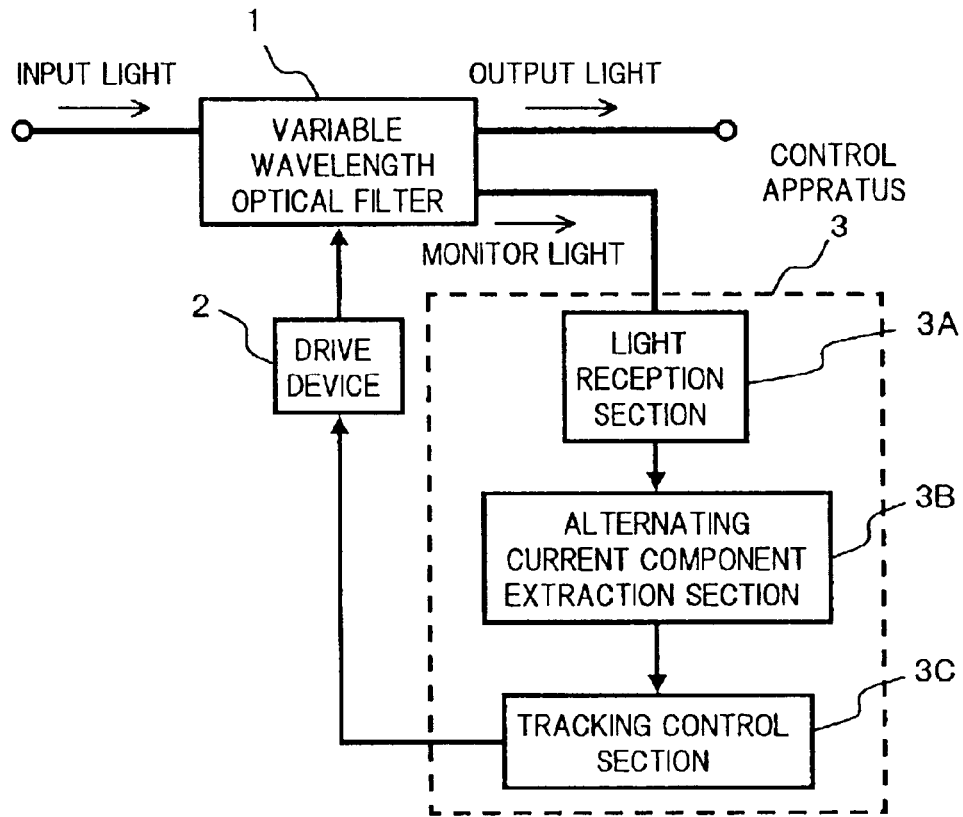
FIG. 1 is a block diagram showing a first embodiment of a control apparatus for a variable wavelength optical filter according to the present invention.

Hereunder is a description of embodiments of the present invention based on the drawings. In the figures, the same reference numerals are used for the same components, and description thereof is omitted.

FIG. 1 is a block diagram showing a first embodiment of a control apparatus for a variable wavelength optical filter according to the present invention.

In FIG. 1, a variable wavelength optical filter 1 which is a device capable of selectively separating in collective, optical signals of desired multiple wavelengths from WDM signal light, can variably set wavelengths of optical signals to be collectively processed, in response to a drive signal from a drive device 2. A control apparatus 3 that tracking controls wavelength setting of the variable wavelength optical filter 1, includes, for example, a light reception section 3A, an alternating current component extraction section 3B and a tracking control section 3C.

The light reception section 3A receives monitor light taken out from the variable wavelength optical filter 1 and generates an electrical signal corresponding to total power thereof. The alternating current component extraction section 3B extracts an alternating current component of the electrical signal output from the light reception section 3A, to output it to the tracking control section 3C. The tracking control section 3C detects an error signal based on the alternating current component extracted by the alternating current component extraction section 3B, and according to the detection result, outputs to the drive device 2, a control signal for performing sequentially the tracking control of the wavelength setting of respective optical signals to be selectively separated by the variable wavelength optical filter 1.

Figure 2:
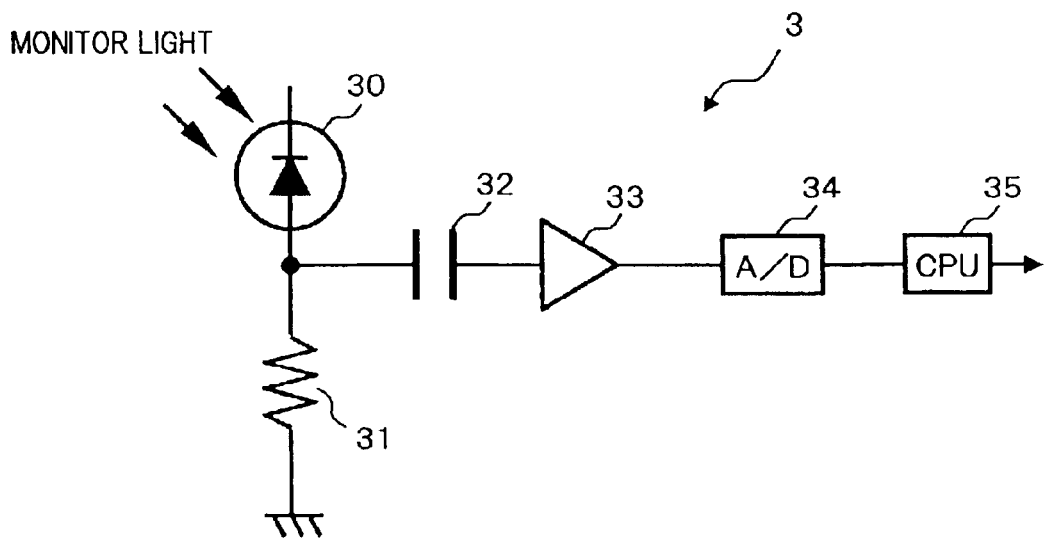
FIG. 2 is a circuit diagram showing a specific configuration example of the control apparatus of the first embodiment.

FIG. 2 is a circuit diagram showing a specific configuration example of the control apparatus 3 of FIG. 1.

In the circuit example of FIG. 2, the monitor light taken out from the variable wavelength optical filter 1, is received by a light receiver 30, and a current signal generated corresponding to light reception power, is converted into a voltage signal by a resistor 31. The voltage signal corresponding to the light reception power is applied to a capacitor 32 with one electrode connected to a node between the light receiver 30 and the resistor 31, and only the alternating current component thereof is output to an amplifier 33 connected to the other electrode of the capacitor 32. In the amplifier 33, the alternating current component of the voltage signal extracted by the capacitor 32, is amplified to a required level to be output to an A/D converter 34. In the A/D converter 34, the amplified analog alternating current component is converted into a digital signal in accordance with a required resolution to be sent to a CPU 35. In the CPU 35, the tracking control for the wavelength setting of the variable wavelength optical filter 1 is executed as described later, based on the alternating current component of the voltage signal converted into the digital signal.

Since determination processing of a monitor voltage in the tracking control by the CPU35 is performed as described hereunder based on the positive or negative in sign, then for the aforementioned A/D converter 34, it is desirable to use an A/D converter of a type corresponding to bipolar input. Note, it is also possible to use a uni-polar type A/D converter, if designing is performed on the circuit. The circuit configuration for the case where a uni-polar type A/D converter is used, shall be explained in detail in another embodiment.

Next, the tracking control performed by the control apparatus 3, will be specifically described with reference to FIG. 3 and FIG. 4.

The tracking control in the present embodiment is performed sequentially and individually for each wavelength for optical signals of multiple wavelengths selectively separated in collective by the variable wavelength optical filter 1. The tracking control for each wavelength slightly changes a supply condition (for example, frequency, power, or the like) of a drive signal corresponding to a wavelength being a control object, detects variations in monitor light power generated due to this change in supply condition as an error signal, and feedback controls the drive signal corresponding to the error signal, to thereby optimize the wavelength setting of the variable wavelength optical filter 1.

In order to specifically describe the aforementioned tracking control, the case is considered where the wavelengths of the optical signals to be selectively separated by the variable wavelength optical filter 1, are varied in response to for example the frequency of the drive signal. In this case, by changing (dithering) the frequency of the drive signal corresponding to the wavelength of the control object, the power of the monitor light detected by the control apparatus 3 is changed with respect to the frequency of the drive signal for example as shown in FIG. 3. An operation for changing the frequency of the drive signal, is performed such that, when the frequency of the drive signal set at a certain point in time is $f_0$, the frequency $f_0$ is changed between a frequency $f_{-}$ (=$f_0$−$\Delta f$) which is shifted to a lower frequency side by $\Delta f$, and a frequency $f_{+}$(=$f_0$+$\Delta f$), which is shifted to a higher frequency side by the same amount $\Delta f$. In the example in FIG. 3, the monitor light power when the frequency is $f_{-}$ corresponds to a point "a", the monitor light power when the frequency is $f_0$ corresponds to a point "b", and the monitor light power when the frequency is $f_{+}$ corresponds to a point "c". Then, the monitor light power at the point "a" and the monitor light power at the point "c" are compared with each other, and a condition of the drive signal is controlled so that the frequency corresponding to the larger monitor light power, becomes a central frequency in the next period control. In the case of the set condition of the frequency shown in FIG. 3, since the monitor light power at the point "c" on the higher frequency side is larger than the monitor light power at the point "a" on the lower frequency side, then the central frequency in the next period control is set to be $f_{+}$.

Figure 3:
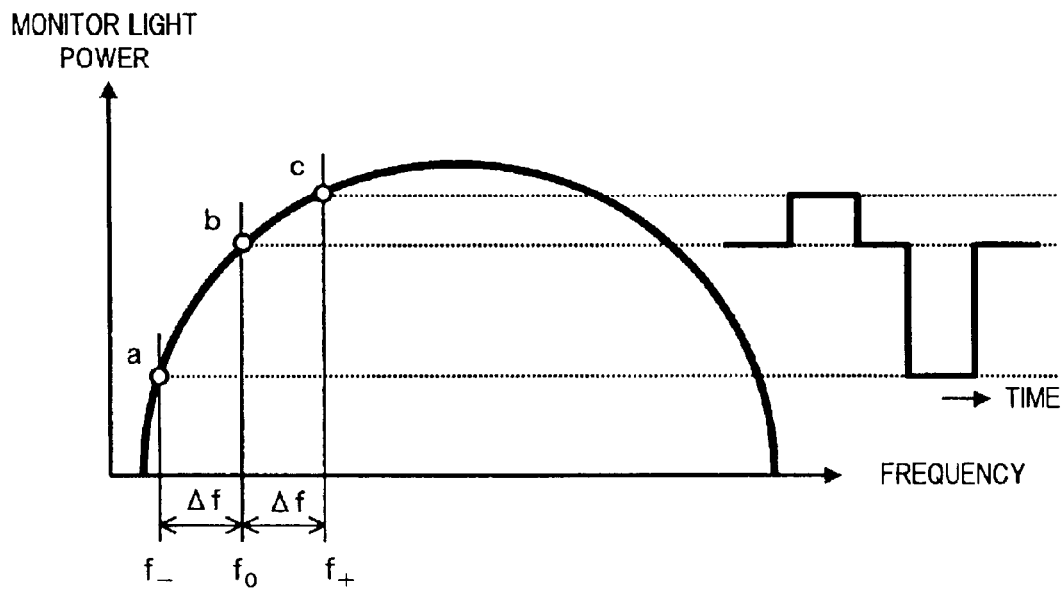
FIG. 3 is a diagram for explaining a tracking control in the first embodiment, showing a change in monitor light power with respect to a drive signal frequency.
Figure 16:
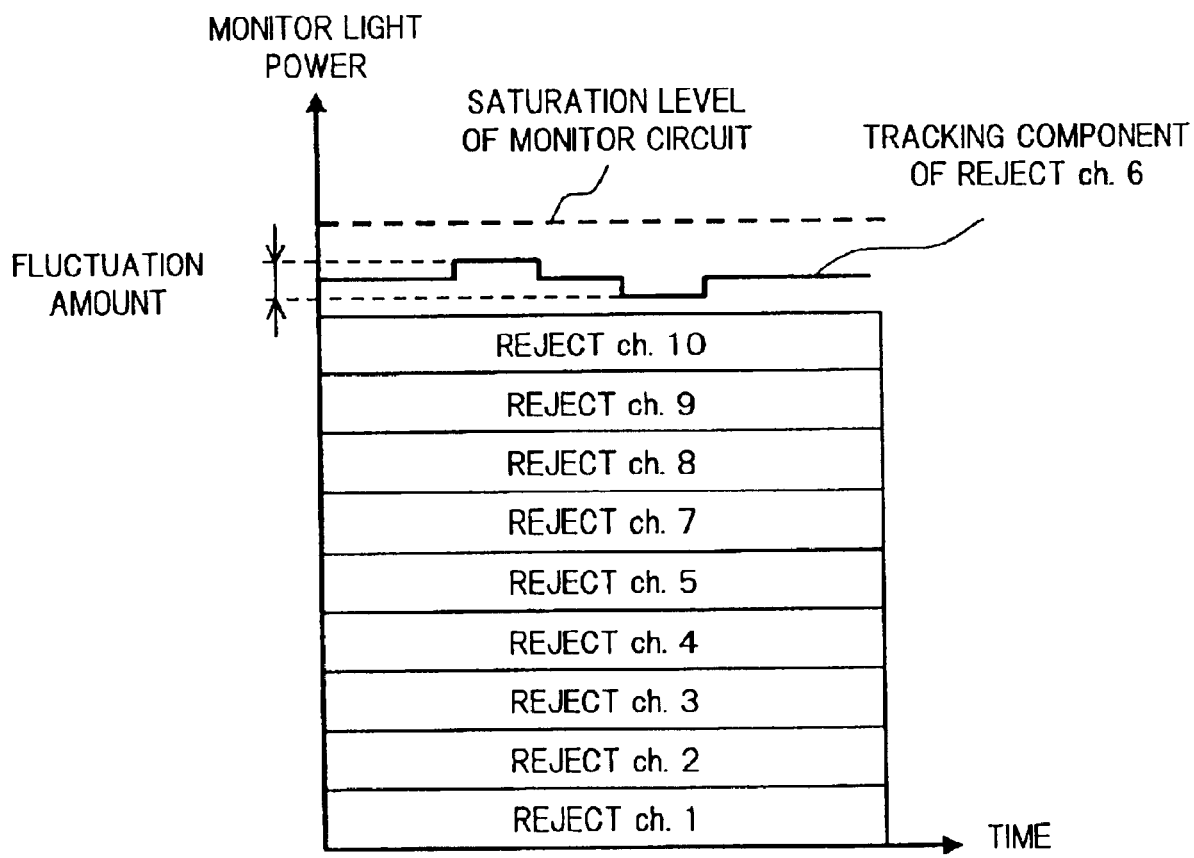
FIG. 16 is a diagram for explaining a problem related to a conventional tracking control of a variable wavelength optical filter.

Such a small or large relationship of the monitor light power, is determined based on the error signal in the waveform such as shown on the right side of FIG. 3, in the conventional case. However, as shown in the aforementioned FIG. 16 and the like, when the number of wavelengths for collective processing by the variable wavelength optical filter 1 is increased, the aforementioned determination becomes difficult. Therefore, in the control apparatus 3 of the present embodiment, the small or large relationship of the monitor light power is determined based on the voltage signal of the alternating current component extracted by the capacitor 32 that functions as the alternating current component extraction section 3B, to thereby realize the stabilized tracking control independent of the number of wavelengths for collective processing.

Figure 4:
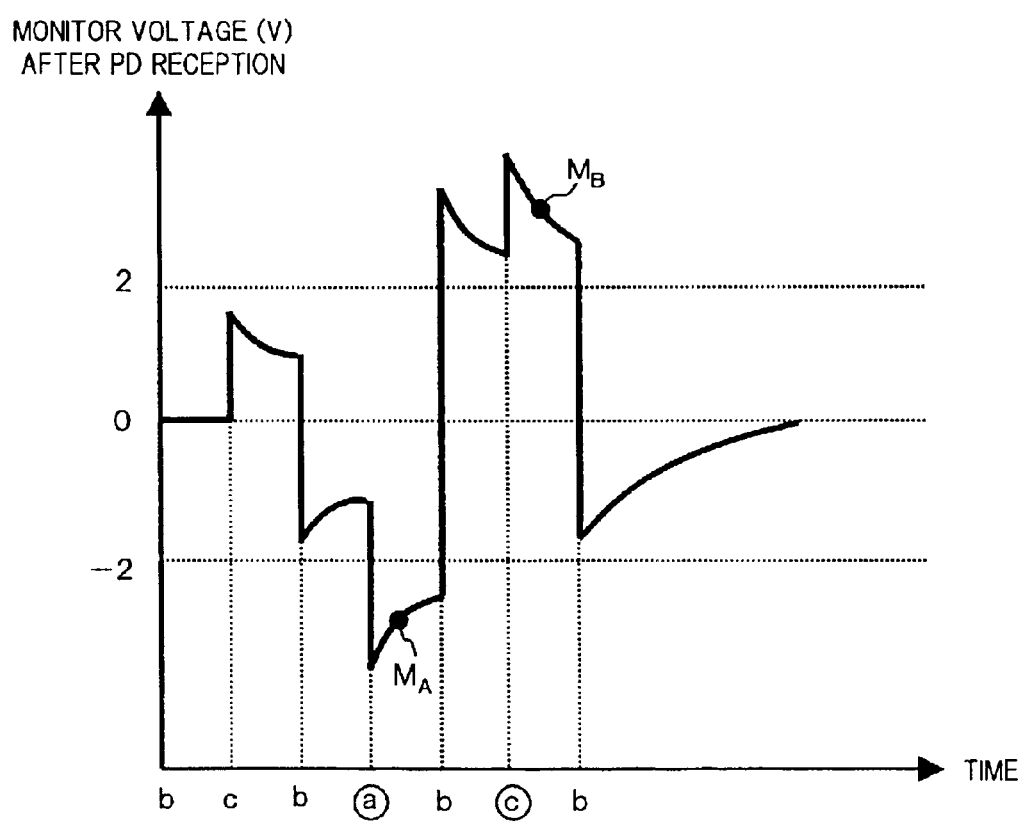
FIG. 4 is a diagram for explaining the tracking control of the first embodiment, showing a waveform example of an alternating current component extracted by a capacitor.

More specifically, a waveform of the alternating current component extracted by the capacitor 32, as shown in FIG. 4 for example, shows only a variation component (difference) of the voltage signal after receiving the monitor light. The waveform in FIG. 4 shows one example of the case where the frequency of the drive signal in the aforementioned FIG. 3 is changed in the sequence of; point "b", point "c", point "b", point "a", point "b", point "c", and point "b". A voltage value which is monitored for such an alternating current component, can be determined, respectively as "increase" when the frequency of the drive signal is changed from point "b" to point "c", "decrease" when changed from point "b" to point "a", "increase" when changed from point "a" to point "b", "decrease" when changed from point "b" to point "c", "increase" when changed from point "a" through point "b" to point "c", and "decrease" when changed from point "c" through point "b" to point "a". Furthermore, regarding each variation component, even with the same "increase", a change amount of from point "a" to point "b" is larger than a change amount of from point "b" to point "c", and even with the same "decrease", a change amount of from point "b" to point "a" is larger than a change amount of from point "c" to point "b". In the present embodiment, by utilizing changes in monitor voltage of such an alternating current component, the change from point "b" to point "a" and the change from point "b" to point "c" are compared with each other, to thereby set the central frequency of the drive signal for the next period control.

When comparing the change from point "b" to point "a" and the change from point "b" to point "c" with each other, for example, in the case where the frequency of the drive signal is changed in sequence from point "b" to point "c", to point "b", to point "a", then for point "c", the change amount of from point "b" which is the starting point of the control where the frequency is not changed, is monitored. Moreover, for point "a", the change amount of from point "b" where the frequency is now being changed, is monitored. Therefore, there is caused a problem in that each change amount cannot be compared under an equivalent condition. In order to solve such a problem and compare the change amounts under the same condition, herein, the frequency of the drive signal is once changed from point "b" to another point. Then, after returning to point "b", the respective changes to point "a" and point "c" are compared with each other. More specifically, in the example of FIG. 4, the frequency of the drive signal is changed from point "b" to point "c", and then is returned to point "b", and the respective changes from point "b" to point "a" and to point "c" (the points denoted by circles in FIG. 4), are compared with each other.

Furthermore, it is desirable to perform the monitoring of the changes from point "b" to point "a" and to point "c", for example, at timing after a required time of period has passed since the frequency of the drive signal has been changed to each point. More specifically, in FIG. 4, voltage values at point $M_A$ and point $M_C$ are monitored. By monitoring the voltage values at such timing, since the monitoring of voltage values in unstable conditions just after the frequency has been changed is avoided, it becomes possible to realize a stable tracking control.

When the voltage values for point $M_A$ and point $M_C$ are monitored, a comparison of each voltage value is made, and the central frequency in the next period control is decided in accordance with a previously set determination standard. The determination standard is, for example, that either the voltage value at point "a" or the voltage value at point "c" is a positive (+) value, then a frequency corresponding to the voltage value for which the positive value is obtained, is made the central frequency for the next period control. Moreover, in the case where, regardless of absolute values of each voltage value at point "a" and point "c", both voltage values become the same sign as positive (+) or negative (−), then the central frequency for the next period control remains the same value at point "b" without change.

When the central frequency for the next period control is decided in accordance with such a determination standard, then similar to the aforementioned case, the comparison of the monitor voltages is repeated for the two points which are changed by Δf from the central frequency to the lower frequency side and the higher frequency side, respectively. As a result, the frequency of the drive signal is tracking controlled so that the power of the monitor light becomes stabile near the maximum value (see FIG. 3). Moreover, by sequentially executing such a tracking control for optical signals of multiple wavelengths selectively separated in collective by the variable wavelength optical filter 1, the filtering characteristic of the variable wavelength optical filter 1 is optimized corresponding to each wavelength.

In this manner, according to the control apparatus 3 of the first embodiment, the tracking control of the variable wavelength optical filter 1 can be reliably and stably performed independent of the number of wavelengths for collective processing. If the variable wavelength optical filter 1 using such a control apparatus 3 is applied to the aforementioned OADM device such as shown in the FIG. 15, it becomes possible to reliably execute a collective drop or a collective block for arbitrary wavelengths for WDM signal light at the OADM node.

Next is a description of a second embodiment of the control apparatus of the variable wavelength optical filter according to the present invention.

Figure 5:
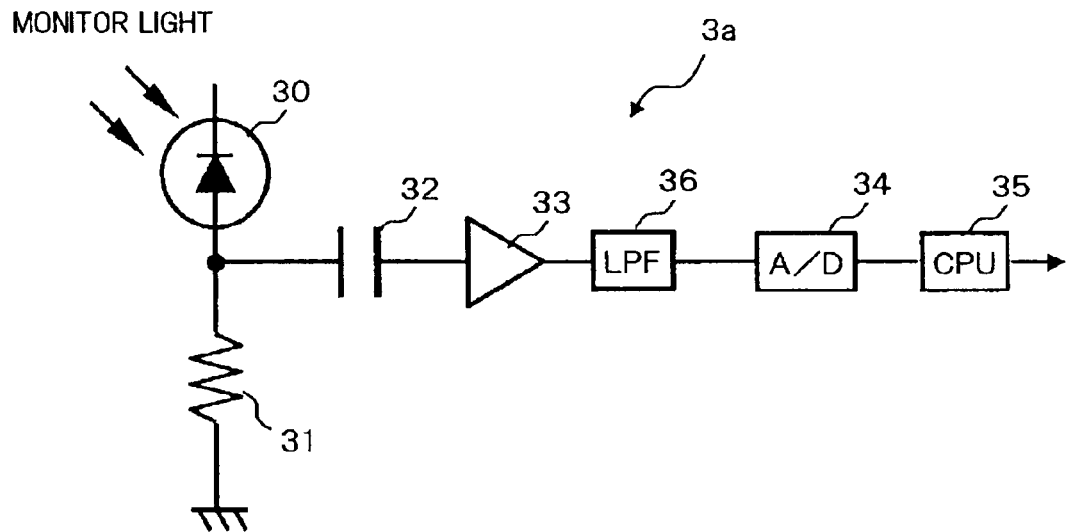
FIG. 5 is a circuit diagram showing a specific configuration example of a control apparatus of a second embodiment according to the present invention.

FIG. 5 is a circuit diagram showing a specific configuration example of the control apparatus of the second embodiment.

In FIG. 5, the configuration of a control apparatus 3a of the present embodiment is different from the configuration of the aforementioned control apparatus 3 shown in the FIG. 2, in that a low pass filter (LPF) 36 is inserted between the output terminal of the amplifier 33 and the input terminal of the A/D converter 34. The components other than the above are the same as for the case of the first embodiment.

The low pass filter 36 is a typical high frequency cut-off filter cutting off components of frequencies equal to or higher than a preset frequency, for an input signal. This low pass filter 36 is provided, for example, in the case where there is an optical power variation or an output variation in an optical amplifier or the like caused by swaying an optical fiber connected to the variable wavelength optical filter, to avoid a possibility that such variation components are mixed with a variation component of optical power due to the tracking of the drive signal. That is, description is given with a specific example, in the case where the tracking of the drive signal (for example, a change in frequency) is performed 500 times per second, the variation component of optical power due to this is an alternating current signal of 500 Hz. In such a case, by cutting off frequency components equal to or higher than 1 kHz, for example, by the low pass filter 36, the aforementioned mixing of the variation components is hard to occur. Therefore, the control apparatus 3a of the second embodiment can execute the tracking control of the variable wavelength optical filter 1 more reliably and stably compared to the case of the first embodiment.

In the second embodiment, the low pass filter 36 has been inserted between the amplifier 33 and the A/D converter 34. However, the low pass filter 36 may be inserted between the capacitor 32 and the amplifier 33. Furthermore, one low pass filter has been inserted, however, for example as shown in a control apparatus 3a' shown in FIG. 6, a plurality (two in the figure) of low pass filters 36 and 36' with different cut-off frequencies may be provided in parallel, so that the low pass filters 36 and 36' are switched corresponding to the control frequency. Moreover, here the low pass filter has been provided for cutting off the variation components due to other factors than the tracking. However, it is also possible to provide a high pass filter (HPF) for cutting off signal components of frequencies equal to or lower than a preset frequency. In addition, the variation components due to other factors than the tracking may be cut off using a combination of a low pass filter and a high pass filter. Furthermore, instead of combining a low pass filter and a high pass filter, it is also possible to use a band pass filter (BPF) having a passing band corresponding to the variation component due to the tracking.

Figure 7:
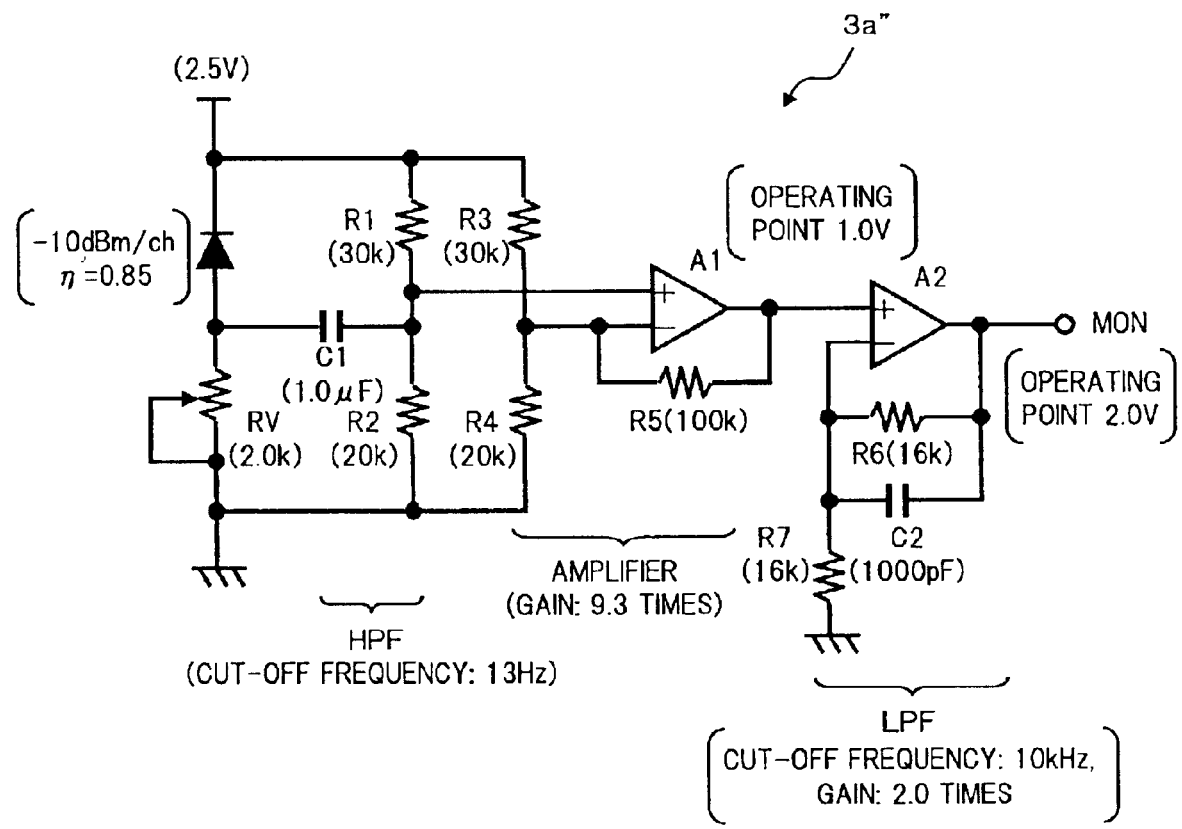
FIG. 7 is a circuit diagram showing another configuration example of a control apparatus related to the second embodiment.

FIG. 7 shows a specific circuit example of a control apparatus in which a low pass filter and a high pass filter are combined. In this circuit example, the high pass filter comprising: a capacitor C1 extracting the alternating current component of the monitor voltage; and resistors R1 and R2, and a low pass filter comprising: an amplifier A2; resistors R6 and R7; and a capacitor C2, are connected in series through an amplifier comprising: an amplifier A1; and resistors R3, R4 and R5. A monitor voltage signal MON, with the variation components due to factors other than the tracking removed, is sent to a CPU through an A/D converter not shown in the figure. In FIG. 7, an example of specific numerical value of each circuit element has been given for the case where it is assumed that, with the input power of monitor light to the light receiver as −10 dBm/ch, monitor light of 10 waves (+0 dBm) at the maximum is input, and the tracking control is performed at a frequency of around 1 kHz. However, the present invention is not limited thereto. In such a control apparatus 3a''', a high cut-off frequency $f_H$ of the low pass filter and a low cut-off frequency $f_L$ of the high pass filter are set so that a relationship of the following equation (1) is satisfied for a tracking interval (frequency $f_T$)

$$f_L < f_T < f_H \quad (1)$$

According to the control apparatus 3a''' to which is applied a filter satisfying the relationship of equation (1), it becomes possible to execute the tracking control of the variable wavelength optical filter 1 more reliably and stably.

As follows is a description of a third embodiment of the control apparatus for the variable wavelength optical filter according to the present invention.

Figure 8:
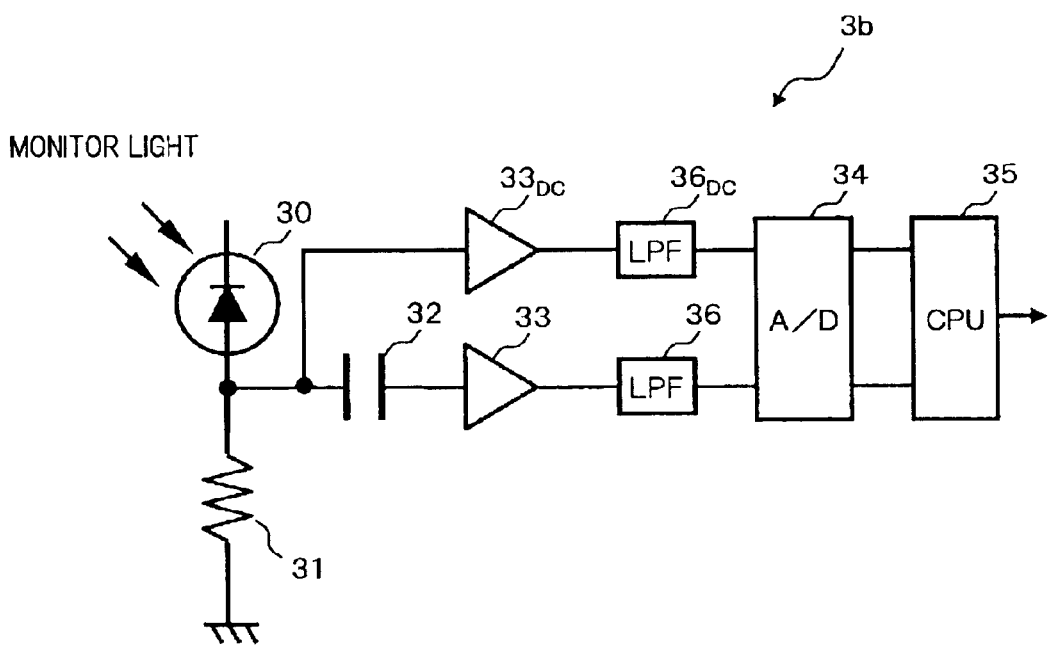
FIG. 8 is a circuit diagram showing a specific configuration example of a control apparatus of a third embodiment according to the present invention.

FIG. 8 is a circuit diagram showing a specific configuration example of the control apparatus of the third embodiment.

In FIG. 8, a control apparatus 3b of the present embodiment is constituted such that, for example in the configuration of the aforementioned second embodiment (FIG. 5), an absolute value of the power of the received monitor light is detected, so that the detection result can be utilized in the tracking control. More specifically, there is added a circuit configuration in which the voltage signal is dropped to be received by the A/D converter 34 through an amplifier $33_{DC}$ and a low pass filter (LPF) $36_{DC}$, before taking out the alternating current component by the capacitor 32 from the voltage signal generated by receiving monitor light by the light receiver 30, that is, an input terminal of the amplifier $33_{DC}$ is connected to between a connection point of the light receiver 30 and the resistor 31, and the capacitor 32,. As a result, it is possible to detect the absolute value (direct current component) of the monitor light power.

The amplifier $33_{DC}$ amplifies the voltage signal dropped before being input to the capacitor 32, to a required level and outputs to the low pass filter $36_{DC}$. Moreover, the low pass filter $36_{DC}$ is previously set so that the cut-off frequency is lower than the frequency of the variation component due to the tracking, and extracts the direct current component of the voltage signal output from the amplifier $33_{DC}$, and outputs to the A/D converter 34.

In the control apparatus 3b of the aforementioned circuit configuration, the alternating current component and the direct current component of the voltage signal, corresponding to the power of the received monitor light, are respectively received by the A/D converter 34, and digital signals corresponding to each component are output to the CPU 35. In the CPU 35, in the case where a value of the signal corresponding to the direct current component is equal to or lower than a required threshold value, a control using the absolute value of the monitor light power is executed. As specific examples of this control using the absolute value of the monitor light power, there can be given judging occurrence of an abnormality such as breakage of fiber when the direct current component value is equal to or lower than the threshold value to suspend the tracking control; performing such processing of sweeping the frequency of the drive signal and the like to detect a desired wavelength light, as that performed by a so-called optical spectrum analyzer, in the case where a deviation occurs in a relationship between a selected wavelength of the variable wavelength optical filter 1, and the frequency of the drive signal and the like, due to a change in environmental temperature; and the like. On the one hand, in the case where the value of the signal corresponding to the direct current component exceeds the threshold value, the aforementioned tracking control using the alternating current component is executed.

Thus, according to the control apparatus 3b of the third embodiment, by properly using the control based on the alternating current component of the monitor voltage and the control based on the direct current component of the monitor voltage, it becomes possible to more flexibly perform the control of the drive condition of the variable wavelength optical filter 1.

Figure 6:
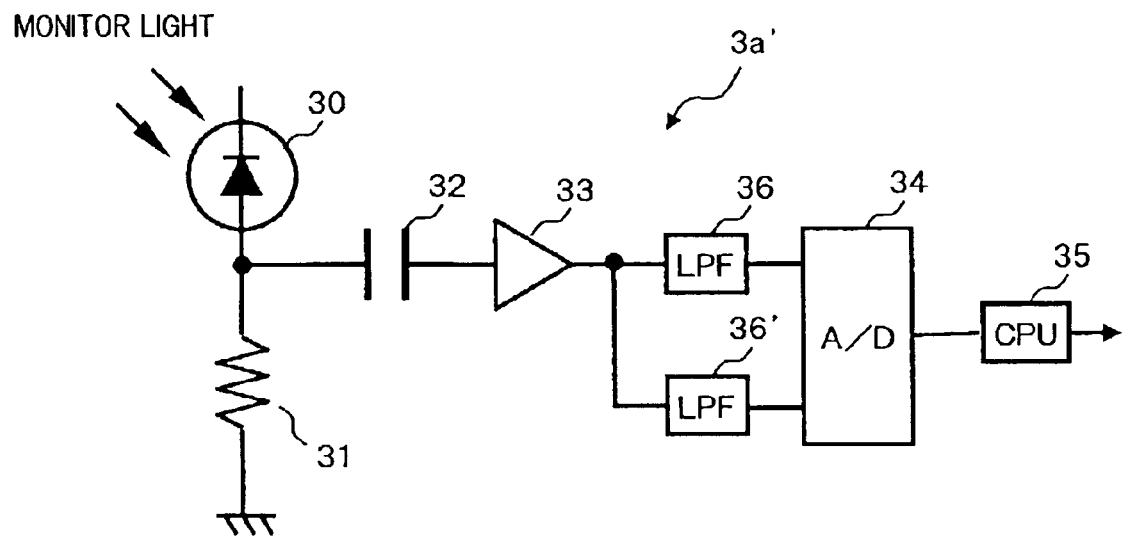
FIG. 6 is a circuit diagram showing another configuration example of a control apparatus related to the second embodiment.

In the third embodiment, the circuit detecting the direct current component of the monitor voltage has been added to the circuit configuration of the second embodiment (FIG. 5). However, the present invention is not limited thereto, and a circuit detecting the direct current component of the monitor voltage may be similarly added to the circuit configuration of the first embodiment (FIG. 2) or the circuit configuration to which the second embodiment is applied (FIG. 6 and FIG. 7).

Figure 9:
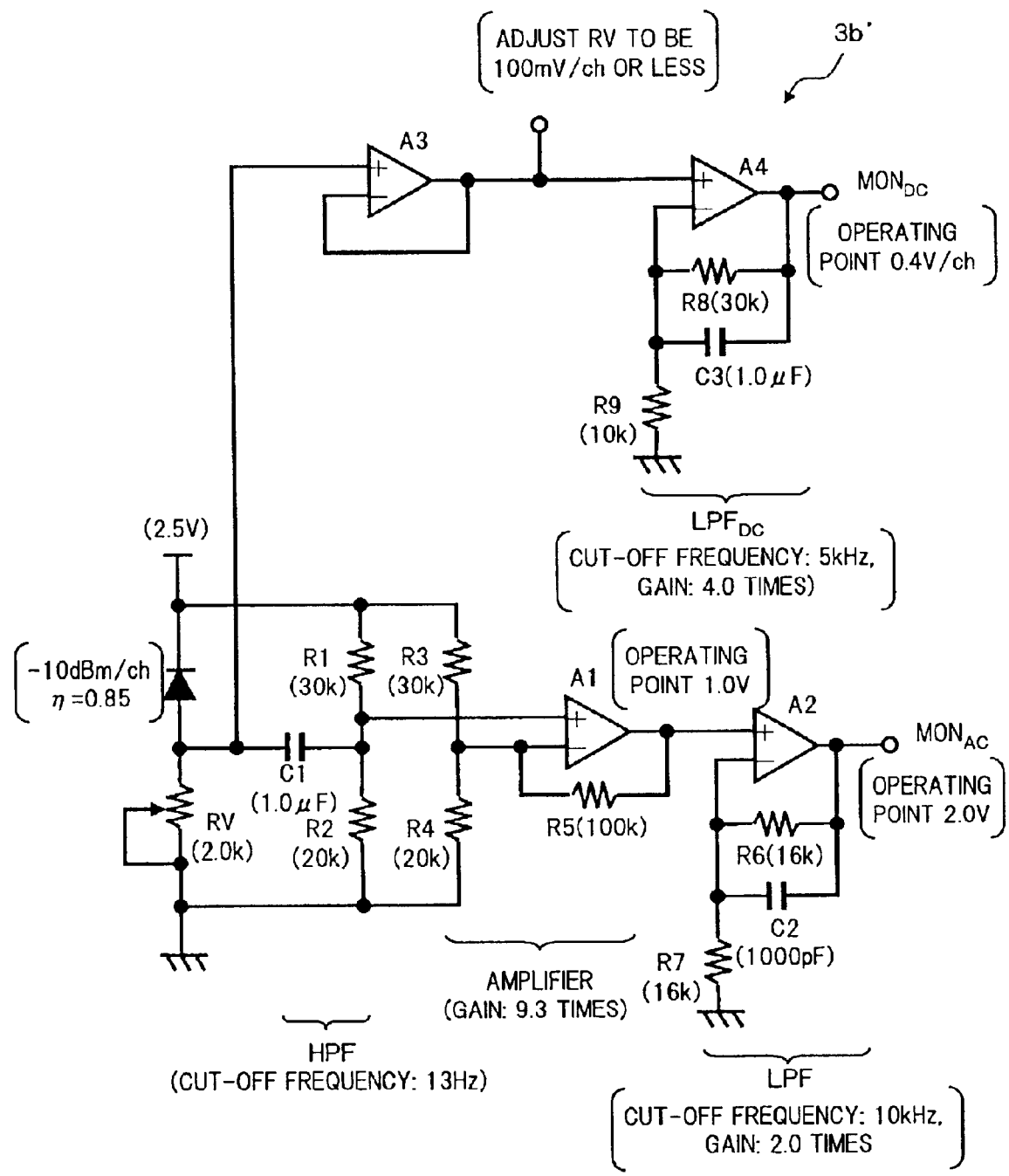
FIG. 9 is a circuit diagram showing another configuration example of a control apparatus related to the third embodiment.

In FIG. 9, there is shown a specific circuit example in which a circuit detecting the direct current component is added to the circuit configuration shown in FIG. 7 in which the low pass filter and the high pass filter are combined on the alternating current component side. In a control apparatus 3b', an input terminal of an amplifier A3 is connected to a node at the former stage of the capacitor C1 extracting the alternating current component of the monitor voltage, and a low pass filter comprising: an amplifier A4; resistors R8 and R9; and a capacitor C3, is connected to an output terminal of the amplifier A3. In FIG. 9, an example of specific numerical value of each circuit element has been given for the case where it is assumed that, with the input power of monitor light to the light receiver as −10 dBm/ch, monitor light of 10 waves (+0 dBm) at the maximum is input, and the tracking control is performed at a frequency of around 1 kHz. However, the present invention is not limited thereto.

As follows is a description of a fourth embodiment of the control apparatus for the variable wavelength optical filter according to the present invention.

Figure 10:
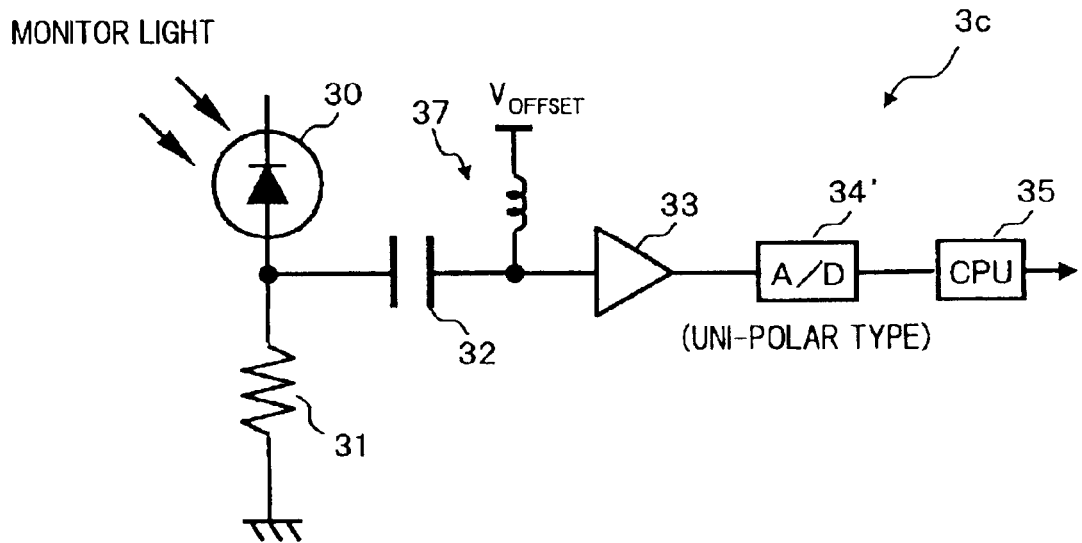
FIG. 10 is a circuit diagram showing a specific configuration example of a control apparatus of a fourth embodiment according to the present invention.

FIG. 10 is a circuit diagram showing a specific configuration example of the control apparatus of the fourth embodiment.

In FIG. 10, a control apparatus 3c of the present embodiment is constituted such that, for the configuration of the first embodiment (FIG. 2) for example, the circuit configuration is modified, so that instead of using the bipolar type A/D converter 34, a uni-polar type A/D converter 34' can be used. Here, an example is shown of using the uni-polar type A/D converter 34' in the configuration of the first embodiment. However, it is also possible to similarly apply the uni-polar type A/D converter to the other embodiments.

In the case where the uni-polar type A/D converter 34' is used, it becomes difficult to determine the sign (positive or negative) related to the monitor voltage value of the alternating current component as shown in the FIG. 4. Therefore, in the configuration example of FIG. 10, an offset voltage $V_{OFFSET}$ is applied between the capacitor 32 and the amplifier 33 using a bias-tee 37 or the like, and a reference voltage of the alternating current component extracted by the capacitor 32 is shifted up from 0V to $V_{OFFSET}$, so that this reference voltage $V_{OFFSET}$ is made the central value of the A/D converter 34'.

More specifically, for example, in the case of using a uni-polar type A/D converter 34' having resolution of 12 bits, since there is the resolution of 4096, then if 1 LSB (Least Significant Bit) is assigned as 1 mV for a range of 0 to 4095 mV, the central value of the range becomes 4095/2=2047.5 mV. Therefore, by setting so that the offset voltage $V_{OFFSET}$ becomes 2047 mV to shift up a reference value of the alternating current component of the monitor voltage from 0 mV to 2047 mV, it becomes possible to A/D convert the voltage value of the alternating current component by the uni-polar type A/D converter 34'. Then, for the monitor voltage of the alternating current component, which is converted to a value of from 0 to 4095 by the A/D converter 34', by subtracting 2047 from a digital value in the CPU 35, it becomes possible to detect the monitor voltage of ±2V.

Figure 11:
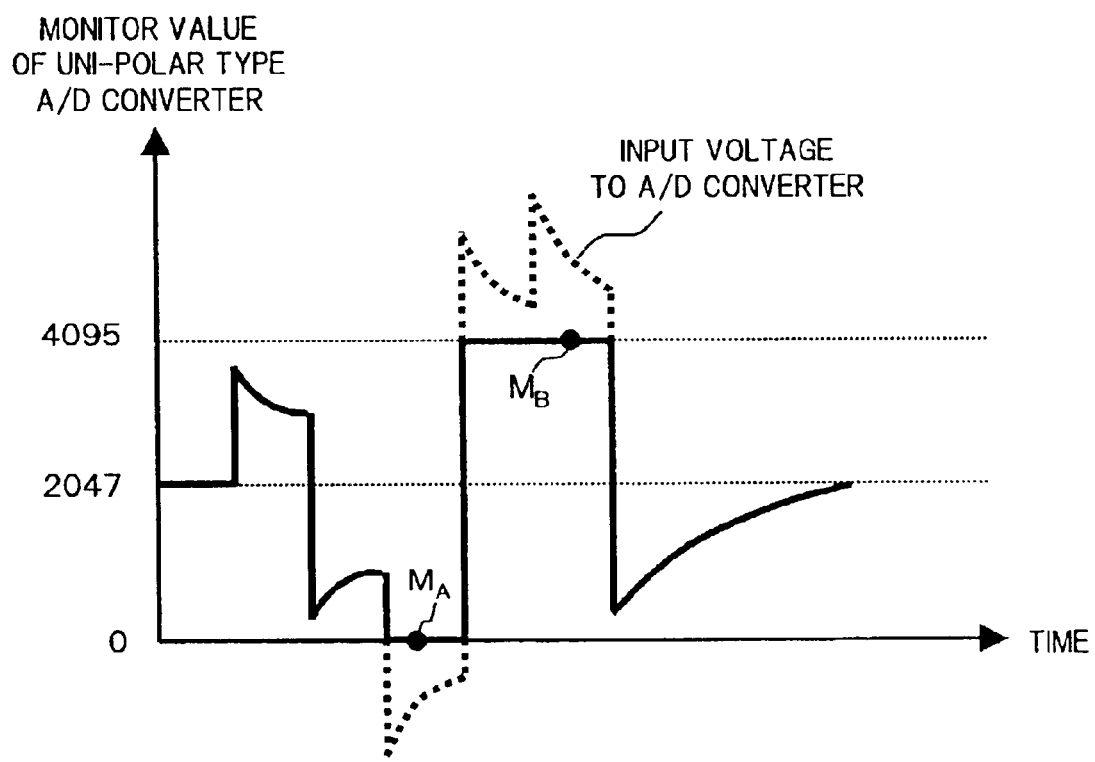
FIG. 11 is a diagram showing an example of monitor value of an A/D converter in the fourth embodiment.

Furthermore, in the aforementioned circuit configuration, it is desirable to set an amplification factor in the amplifier 33 to be sufficiently high. Here, the amplification factor of the amplifier 33 is set as high as 10 times. The reason for such a setting is that, for example, as shown by the solid line in FIG. 11, by making the amplification factor high, then even if there is caused a condition where a monitor value of the A/D converter 34' approximates to each value corresponding to 0 mV and 4095 mV, no problem arises in the aforementioned tracking control, because the value for the next control period is determined based on only the sign (positive or negative) of the monitor voltage of the alternating current component, and because it becomes possible to perform more reliably the determination of sign of the monitor voltage as the amplification factor is set to be higher.

In this manner, according to the fourth embodiment, even if the alternating current component of the monitor voltage is A/D converted using the uni-polar type A/D converter 34', it is possible to obtain a similar operational effect to the case of the aforementioned first embodiment.

In connection with the aforementioned fourth embodiment, a brief description is given on an application example of control, which considers an influence of a floating voltage occurring when monitor light is not received. Even in either case where a bipolar type or uni-polar type A/D converter is used, when monitor light is not received, there is a case where a floating voltage of a several tens of mV remains in the voltage after passing through the capacitor 32, so that the monitor voltage does not become 0 V. This depends on device configuration, pattern design of a substrate and so on, and occurs for example when a ground voltage cannot be held precisely or when a ground level is slightly offset. Such a floating voltage has an adverse effect on the tracking control. That is, a value that should actually be 0 V but corresponds to a several tens of mV, is output from the A/D converter, so that an error occurs in the determination of sign at a minute voltage. To avoid such a floating voltage effect, then for example, under a condition where the monitor light is not received such as at the time of starting up the device or when turning on the unit power supply, a value may be initially taken from the A/D converter, to correct the monitor value then using this value. More specifically, assuming the initially taken value of the A/D converter is $V_D$, then as shown in the following equation (2), by subtracting the initial value $V_D$ from a voltage value $V_{MON}$ monitored at the time of the tracking control, and further subtracting a shifted-up voltage $V_{OFFSET}$ if a uni-polar type A/D converter is used, a real monitor value V which is corrected for the floating voltage effect can be obtained.

$$V = V_{MON} - V_D - V_{OFFSET} \qquad (2)$$

In the aforementioned first through fourth embodiments, the tracking control has been performed by changing the frequency of the drive signal corresponding to each wavelength of multiple optical signals for collective processing. However, the control parameter for the drive signal is not limited to the frequency, and it is also possible to tracking control the wavelength characteristic of the variable wavelength optical filter by, for example, changing the power (amplitude) and the like of the drive signal. Furthermore, in the case where the tracking control is performed by changing a plurality of control parameters of the drive signal, at first the tracking control of all selected wavelengths may be performed for one control parameter (for example frequency), and then the tracking control of all selected wavelengths may be performed for the other control parameters (for example power). If tracking control is performed sequentially in this manner for a plurality of control parameters, it is possible to optimize the wavelength characteristic of the variable wavelength optical filter with higher accuracy.

Next is a description of a specific example of an OADM device applied with a variable wavelength optical filter which uses the control apparatus according to the present invention as shown in the first through fourth embodiments.

Figure 12:
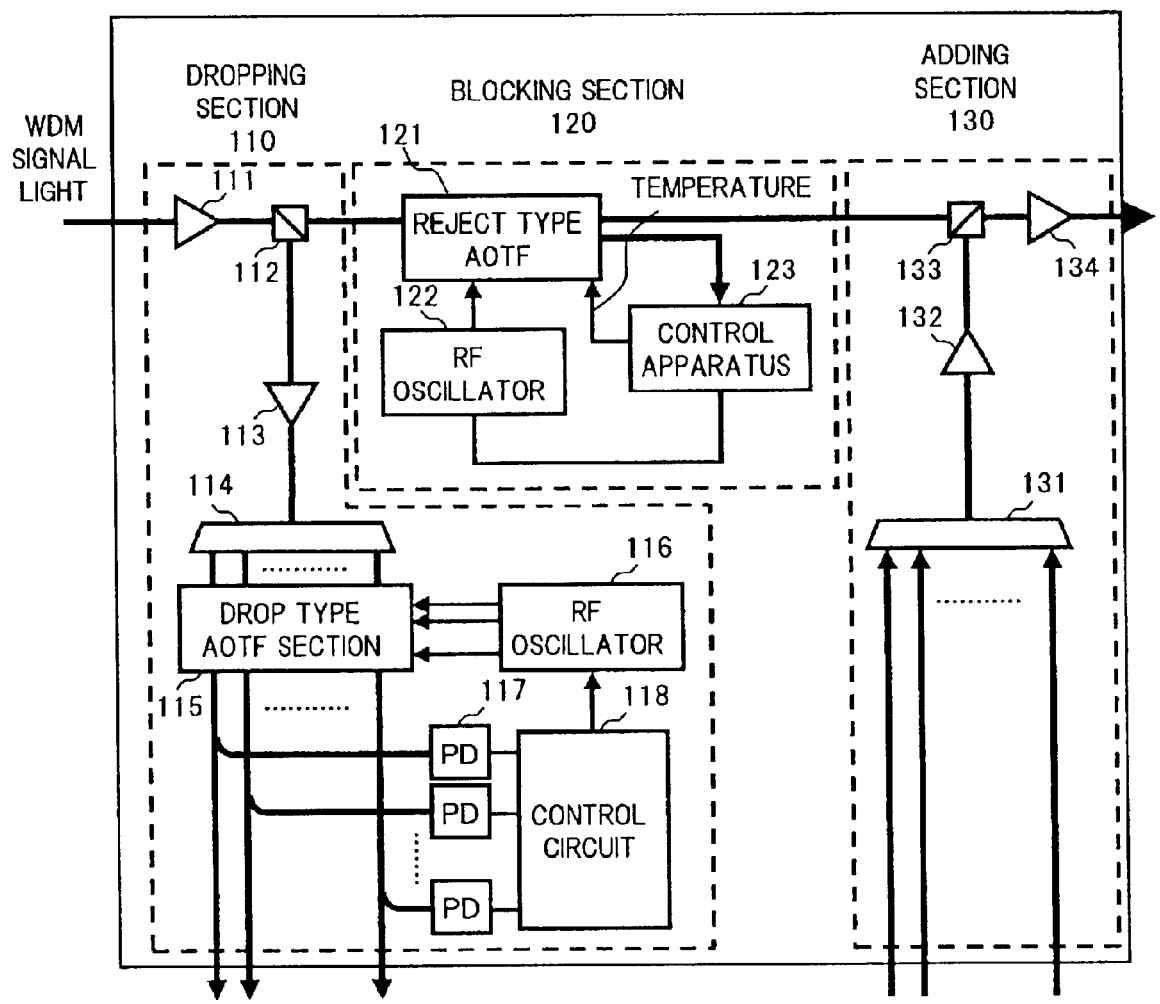
FIG. 12 is a diagram showing a configuration example of an OADM device to which is applied a reject type AOTF using a control apparatus according to the present invention.

FIG. 12 is a diagram showing a configuration example of an OADM device applied with a reject type AOTF which uses the control apparatus according to the present invention.

Figure 14:
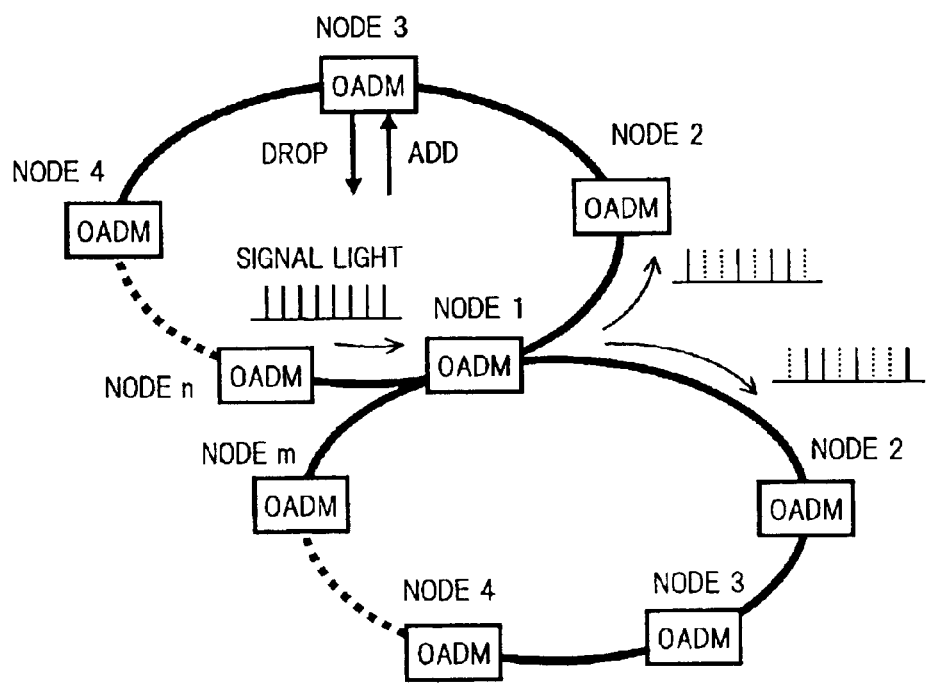
FIG. 14 is a diagram showing an example of a conventional network configuration of OADM nodes using AOTFs.
Figure 15:
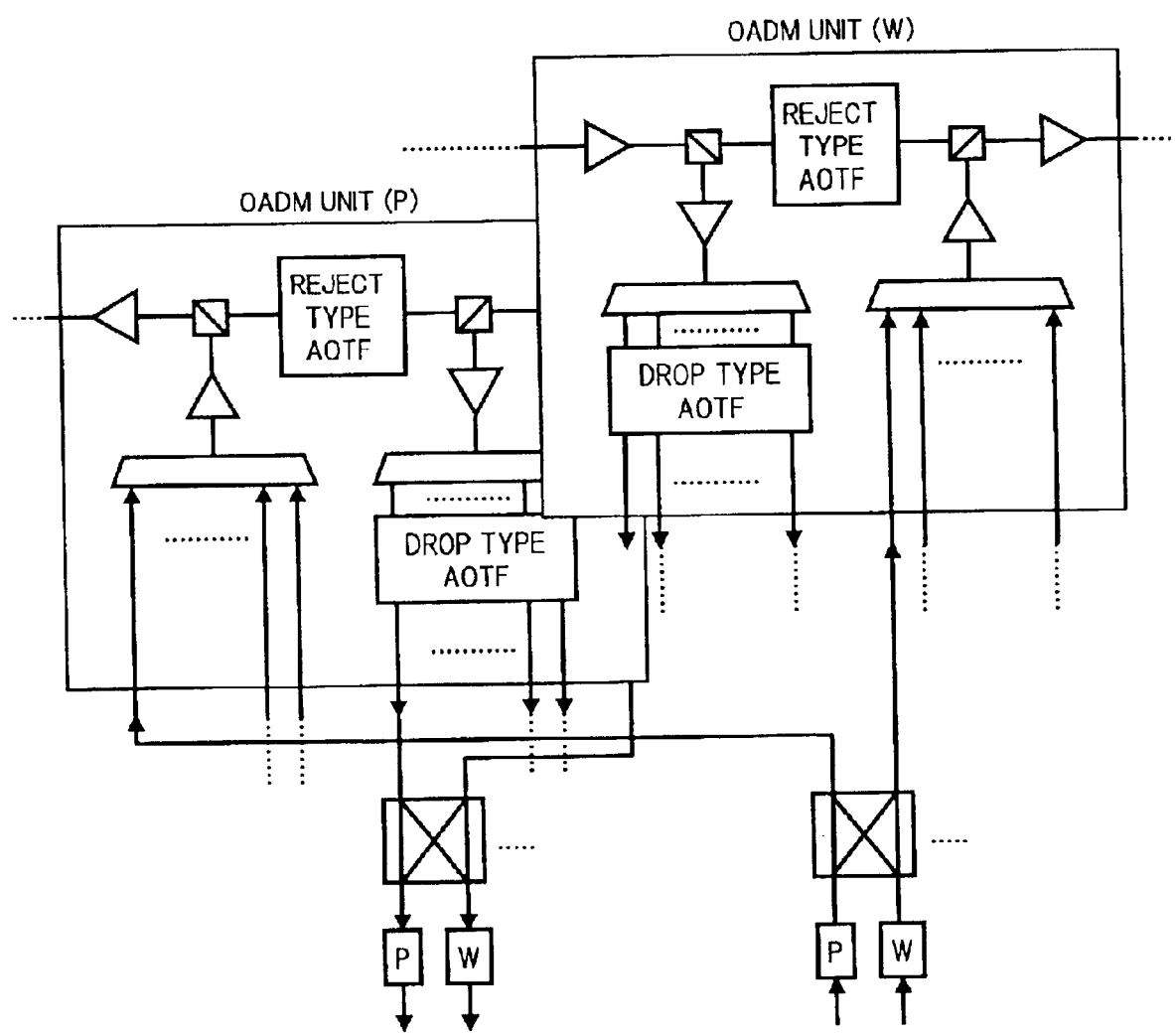
FIG. 15 is a diagram showing a configuration example of an OADM device used for each node in FIG. 14.

An OADM device 100 in FIG. 12, comprises for example: a dropping section 110 selectively dropping an optical signal of a desired wavelength from input WDM signal light; a blocking section 120 blocking passage of an optical signal of a desired wavelength; and an adding section 130 adding an optical signal of a desired wavelength into the WDM signal light passed through the blocking section, and a control apparatus according to any one of the first through fourth embodiments is applied to a reject type AOTF121 used in the blocking section 120. The OADM device 100 can be used for example for each of the aforementioned OADM units as shown in FIG. 15, and can be arranged at each OADM node of the network as shown in FIG. 14.

Briefly describing the configuration of each part of the OADM device 100, in the dropping section 110, for example, after the WDM signal light input to the OADM device 100 is amplified by an optical amplifier 111 to a required level, a part thereof is branched by a branching filter 112 and then amplified to a required level by an optical amplifier 113 to be sent to a branching filter 114. Then, in the branching filter 114, the WDM signal light from the optical amplifier 113 is further branched into a plurality of optical signals to be respectively output to a drop type AOTF section 115. In the drop type AOTF section 115, a plurality of AOTFs are formed in an array. Each AOTF is driven by an RF signal from an RF oscillator 116, and each of the optical signals from the branching filter 114 is received by each of the AOTFs, and a desired one wave is selectively separated by each of the AOTFs to be output. Furthermore, a part of each optical signal selectively separated by the drop type AOTF 115 is received as monitor light by each light receiver (PD) 117 to be transmitted to a control circuit 118. In the control circuit 118, the selected wavelength of each AOTF of the drop type AOTF section 115 is feedback controlled by adjusting a generation condition of each RF signal in the RF oscillator 116 in accordance with the power of each monitor light.

Moreover, the blocking section 120 includes a reject type AOTF 121 to which is input WDM signal light that has passed through the branching filter 112 of the dropping section 110. The reject type AOTF 121 blocks in collective the passage of optical signals of desired multiple wavelengths, in accordance with a plurality of RF signals of different frequencies supplied from an RF oscillator 122. Then, using monitor light corresponding to a plurality of optical signals whose passage has been blocked by the reject type AOTF 121, the frequency or the like of each RF signal supplied from the RF oscillator 122 to the reject type AOTF 121 is tracking controlled to be optimized, by a control apparatus 123 to which any one of the first through fourth embodiments is applied.

Furthermore, in the adding section 130, a plurality of added light of desired wavelengths supplied from the outside etc. of the OADM device 100 are multiplexed by a multiplexer 131, and then amplified to a required level by an optical amplifier 132, to be further multiplexed with WDM signal light passed through the blocking section 120 by a multiplexer 133. Then, the WDM signal light passed through the multiplexer 133 is amplified to a required level by an optical amplifier 134 to be output from the OADM device 100.

Here is a description for a specific configuration example of the reject type AOTF 121 of the blocking section 120. The example shown hereunder is disclosed in detail in Japanese Patent Application No. 2001-399237 and Japanese Patent Application No. 2001-39924, being prior applications of the present applicant. Therefore, here only an outline is described, and details are omitted. Moreover, the configuration of the AOTF serving as the variable wavelength optical filter according to the present invention, is not limited to the example hereunder.

Figure 13:
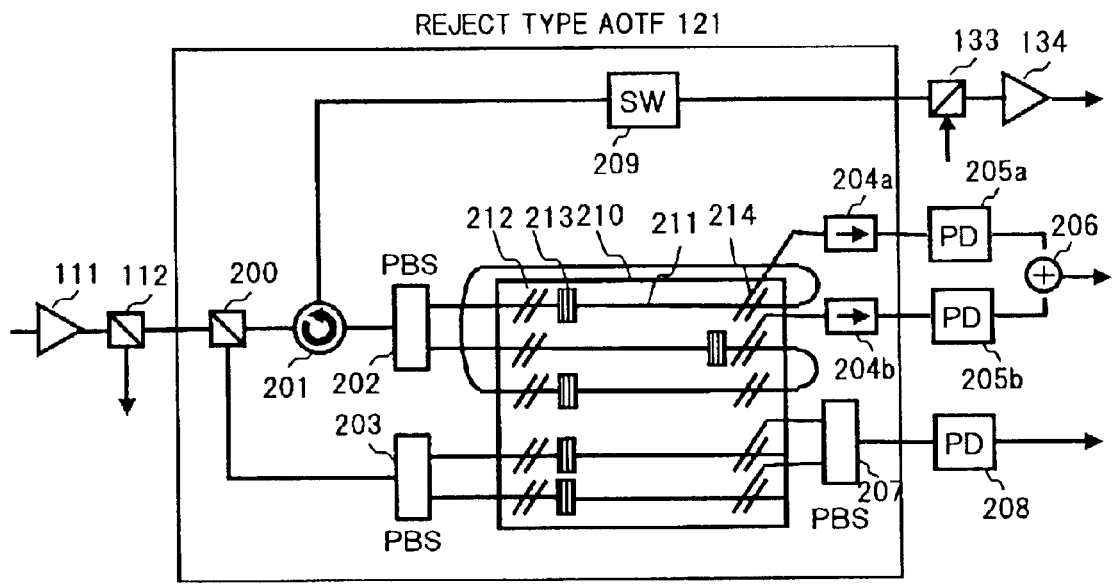
FIG. 13 is a plan view showing a specific configuration example of the reject type AOTF of FIG. 12.

FIG. 13 is a plan view showing an example of a preferred configuration of the reject type AOTF121. In the reject type AOTF121 of FIG. 13, WDM signal light passed through the branching filter 112 of the dropping section, is branched into two by a branching filter 200, and one of the branched light is sent to a polarization beam splitter (PBS) 202 via an optical circulator 201, and the other of the branched light is output to another PBS 203. The PBS 202 branches into two the WDM signal light passed through the optical circulator 201, according to polarization modes, and sends each mode light to opposite ends of an optical path of a reject type AOTF constructed by cascade loop connecting three AOTFs on a substrate 210. The PBS 203, as with the PBS 202, branches into two the WDM signal light branched by the branching filter 200, according to polarization modes, and sends each mode light to one end of each optical path of a monitoring AOTF operating based on the same parameters as the cascade loop connected three-staged AOTFs on the substrate 210. The monitoring AOTF is for previously detecting a control value of the cascade loop connected three-staged AOTFs at the time of starting the reject type AOTF 121, at the time of modifying the setting or the like. This monitoring AOTF is appropriately provided as required, and may also be omitted.

The AOTFs of each stage constituting the three-staged AOTF and the monitoring AOTF, which are formed on the same substrate 210, each has a similar construction. More specifically, in the AOTF of each stage, polarization beam slitters 212 and 214 are respectively provided at opposite end portions of an optical waveguide 211 formed on the substrate 1, and an inter-digital transducer (IDT) 213 generating a surface acoustic wave (SAW) is formed at a predetermined position on the optical waveguide 211. Moreover, although here omitted from the figure, an SAW guide for propagating the SAW generated by the IDT 213 along the optical waveguide 211, and an SAW absorber for terminating, at a predetermined position, the SAW that has been propagated, are provided. In such AOTFs of respective stages, a plurality of RF signals with different frequencies, which are generated by the RF oscillator 122 (FIG. 12), are applied to the IDTs 213, to thereby generate an SAW corresponding to each RF signal. Due to the acousto-optic effect caused by the transmission of the SAW along the optical waveguide 211, of the optical signals propagated within the optical waveguide 211, only those optical signal with a wavelength corresponding to the frequency of the SAW are polarization mode converted and selectively separated.

The optical signals selectively separated by the three-staged AOTF are respectively branched from the optical waveguide 211 by two PBSs 214, and received by light receivers (PD) 205a and 205b, via optical isolators 204a and 204b. Then, output signals from the light receivers 205a and 205b are added to each other by an adder 206 and sent to the control apparatus 123 (FIG. 12) as a monitor signal. Furthermore, optical signals selectively separated by the monitoring AOTF are also respectively branched by the PBSs 214 at the end portion of each optical waveguide 211, to be received by a light receiver 208 after multiplexed by a PBS207. Then, an output signal from the light receiver 208 is sent to the control apparatus 123 as a monitor signal for previously detecting a control value of the three-staged AOTF at the time of starting the device, at the time of modifying the setting and the like.

Moreover, optical signals that have not been selectively separated by the three-staged AOTF, are returned to the PBS 202 and are combined, and then sent to the multiplexer 133 of the adding section 130 via the optical circulator 201 and a light switch (SW) 209.

As mentioned above, the frequency of the RF signal generated by the RF oscillator 122 is tracking controlled utilizing the monitor light taken out from the reject type AOTF 121, and based on the alternating current component of the monitor voltage processed by the control apparatus 123 of the present invention. Furthermore, here, in addition to the tracking control of the frequency of the RF signal, the control apparatus 123 previously detects a control value at the time of starting or at the time of modifying the setting by using the monitor light at the monitoring AOTF, and at the same time, performs a control of the selected wavelength by means of temperature adjustment of the reject type AOTF121, thereby enabling to realize the block processing of optical signal of a desired wavelength with higher accuracy.

In the aforementioned OADM device 100, the control apparatus according to the present invention has been applied to the reject type AOTF 121 of the blocking section 120. However, in the case where collective drop processing for WDM signal light is performed also in the dropping section 110, it is possible to apply the control apparatus according to the present invention to the tracking control of a variable wavelength optical filter used for the collective drop processing. Furthermore, here an AOTF has been considered as a specific example of the variable wavelength optical filter. However, the variable wavelength optical filter to which the control apparatus of the present invention is applicable, is not limited to the AOTF. For example, it is possible to apply known variable wavelength optical filters such as a variable wavelength type fiber Bragg grating (FBG) filter, having a construction where collective processing of optical signals of a plurality of wavelengths is possible, and the power of a plurality of monitor lights can be detected simultaneously.

What is claimed are:

1. A control method for a variable wavelength optical filter that permits a wavelength division multiplexing signal light including a plurality of optical signals having mutually different peak wavelengths at which a maximum power of light is provided, respectively, to be input thereto, and selectively separates, in collective, the plurality of optical signals of different peak wavelengths from the wavelength division multiplexing signal light, for changing a drive condition of said variable wavelength optical filter, and controlling a wavelength characteristic of said variable wavelength optical filter to become closer to a wavelength characteristic corresponding to a preset plurality of selected wavelengths, based on power of monitor light taken out from said variable wavelength optical filter, comprising:

taking out in collective to receive the monitor light corresponding to the plurality of optical signals having different peak wavelengths selectively separated by said variable wavelength optical filter from the wavelength division multiplexing signal light, and generating a monitor signal of a level which is changed corresponding to the power of said received monitor light;

extracting an alternating current component of said generated monitor signal; and controlling the drive condition of said variable wavelength optical filter based on a level change in said extracted alternating current component.

2. A control method for a variable wavelength optical filter according to claim 1, wherein only a level variation component corresponding to a change in drive condition of said variable wavelength optical filter is extracted from said extracted alternating current component, and the drive condition of said variable wavelength optical filter is controlled based on said extracted level variation component.

3. A control method for a variable wavelength optical filter according to claim 1, further comprising:

extracting a direct current component of said monitor signal is extracted; and controlling the drive condition of said variable wavelength optical filter based on a level of said extracted direct current component.

4. A control method for a variable wavelength optical filter according to claim 3, wherein when the level of said direct current component is equal to or less than a previously set threshold value, the control of the drive condition based on the level of said alternating current component is switched to the control of the drive condition based on the level of said direct current component.

5. A control method for a variable wavelength optical filter according to claim 1, further comprising:

changing the drive condition of said variable wavelength optical filter to a first condition and a second condition for which change amounts from a preset reference condition are mutually equal; and determining whether the reference condition in the next period control is to be set to said first condition or to said second condition, corresponding to a sign of a level value of the alternating current component extracted from said monitor signal.

6. A control method for a variable wavelength optical filter according to claim 5, wherein for said level value of the alternating current component, a value at the point in time when the drive condition of said variable wavelength optical filter is changed from the second condition through the reference condition to the first condition, is made the level value of the first condition, and a value at the point in time when the drive condition is changed from the first condition through the reference condition to the second condition, is made the level value of the second condition.

7. A control method for a variable wavelength optical filter according to claim 5, wherein when the drive condition of said variable wavelength optical filter is changed corresponding to a plurality of control parameters, the control of drive condition is performed on all of the selected wavelengths for each of the respective control parameters.

8. A control apparatus for a variable wavelength optical filter that permits a wavelength division multiplexing signal light including a plurality of optical signals having mutually different peak wavelengths at which a maximum power of light is provided, to be input thereto, and selectively separates, in collective, the plurality of optical signals of different peak wavelengths from the wavelength division multiplexing signal light, for changing a drive condition of the variable wavelength optical filter, and controlling a wavelength characteristic of the variable wavelength optical filter to become closer to a wavelength characteristic corresponding to a preset plurality of selected wavelengths, based on power of monitor light taken out from the variable wavelength optical filter, comprising:

a light reception section that takes out in collective to receive the monitor light corresponding to the plurality of optical signals of different peak wavelengths selectively separated by said variable wavelength optical filter from the wavelength division multiplexing signal light, and generating a monitor signal a level of which is changed corresponding to the power of said received monitor light;

an alternating current extraction section that extracts an alternating current component of the generated monitor signal; and a control section that controls the drive condition of said variable wavelength optical filter based on a level change in the alternating current component extracted by said alternating current component extraction section.

9. A control apparatus for a variable wavelength optical filter that permits a wavelength division multiplexing signal light including a plurality of light signals having different wavelengths to be input thereto, and selectively separates, in collective, optical signals of a plurality of wavelengths from the wavelength division multiplexing signal light, for changing a drive condition of the variable wavelength optical filter, and controlling a wavelength characteristic of the variable wavelength optical filter to become closer to a wavelength characteristic corresponding to a preset plurality of selected wavelengths, based on power of monitor light taken out from the variable wavelength optical filter, comprising:

a light reception section that takes out in collective to receive the monitor light corresponding to a plurality of optical signals selectively separated by said variable wavelength optical filter from the wavelength division multiplexing signal light, and generating a monitor signal a level of which is changed corresponding to the power of said received monitor light;

an alternating current extraction section that extracts an alternating current component of the generated monitor signal; and a control section that controls the drive condition of said variable wavelength optical filter based on a level change in the alternating current component extracted by said alternating current component extraction section, wherein said alternating current component extraction section includes a capacitor inserted on a signal line that transmits the monitor signal from said light reception section to said control section.

10. A control apparatus for a variable wavelength optical filter according to claim 9, further comprising;

a filter extracting only a level variation component corresponding to a change in drive condition of said variable wavelength optical filter from said extracted alternating current component, wherein said control section controls the drive condition of said variable wavelength optical filter based on said extracted level variation component.

11. A control apparatus for a variable wavelength optical filter according to claim 9, further comprising:

a direct current component extracting section that extracts a direct current component of the monitor signal, wherein said control section controls the drive condition of said variable wavelength optical filter based on a level of said extracted direct current component.

12. A control apparatus for a variable wavelength optical filter according to claim 11, wherein when the level of said direct current component is equal to or less than a previously set threshold value, said control section switches the control of the drive condition based on the level of said alternating current component to the control of the drive condition based on the level of said direct current component.

13. A control apparatus for a variable wavelength optical filter according to claim 9, wherein said control section changes the drive condition of said variable wavelength optical filter to a first condition and a second condition for which change amounts from a preset reference condition are mutually equal, and determines whether the reference condition in the next period control is to be set to said first condition or to said second condition, corresponding to a sign of a level value of the alternating current component extracted from said monitor signal.

14. A control apparatus for a variable wavelength optical filter according to claim 13, wherein for said level value of the alternating current component, said control section sets a value at the point in time when the drive condition of said variable wavelength optical filter is changed from the second condition through the reference condition to the first condition, as the level value of the first condition, and a value at the point in time when the drive condition is changed from the first condition through the reference condition to the second condition, as the level value of the second condition.

15. A control apparatus for a variable wavelength optical filter according to claim 13, wherein when the drive condition of said variable wavelength optical filter is changed corresponding to a plurality of control parameters, said control section performs the control of drive condition on all of the selected wavelengths for each of the respective control parameters.

16. A control apparatus for a variable wavelength optical filter according to claim 13, wherein said control section includes a detector A/D converting the alternating current component extracted by said alternating current extraction section.

17. A control apparatus for a variable wavelength optical filter according to claim 16, wherein the detector A/D comprises a uni-polar detector, and said control section increases a voltage level of an output signal from said alternating current component extraction section by ½ times of an input range of said detector.

18. A control apparatus for a variable wavelength optical filter according to claim 9, wherein said control section detects as a correction value, a voltage level of the monitor signal in a condition where the monitor light is not received by said light reception section, and corrects an error by subtracting said correction value from a voltage level of the monitor signal in a condition where the monitor light is received by said light reception section.

19. A control apparatus for a variable wavelength optical filter according to claim 9, wherein said variable wavelength optical filter is an acousto-optic tunable filter.

20. A control apparatus for a variable wavelength optical filter according to claim 9, wherein said variable wavelength optical filter is a fiber Bragg grating filter.

21. A control method for changing a drive condition of a variable wavelength optical filter which receives a wavelength division multiplexing signal light including a plurality of optical signals having mutually different peak wavelengths at which a maximum power of light is provided, respectively, the method comprising:

selectively separating the optical signals of the different peak wavelengths from the wavelength division multiplexing signal light;

receiving monitor light corresponding to the optical signals;

generating a monitor signal of a level which corresponds to power of the received monitor light;

extracting an alternating current component of the generated monitor signal; and controlling the drive condition of the variable wavelength optical filter based on a level change in the extracted alternating current component.

22. An control apparatus for a variable wavelength filter, comprising:

a light receptor which receives monitor light corresponding to optical signals having mutually different peak wavelengths at which a maximum power of light is provided, respectively, selectively separated by the variable wavelength optical filter from a wavelength division multiplexing signal light, and generates a monitor signal of a level corresponding to the power of the received monitor light;

an alternating current extractor which extracts an alternating current component of the generated monitor signal; and a controller which controls a drive condition of the variable wavelength optical filter based on a level change in the extracted alternating current component.

* * * * *